UNITED STATES PATENT OFFICE.

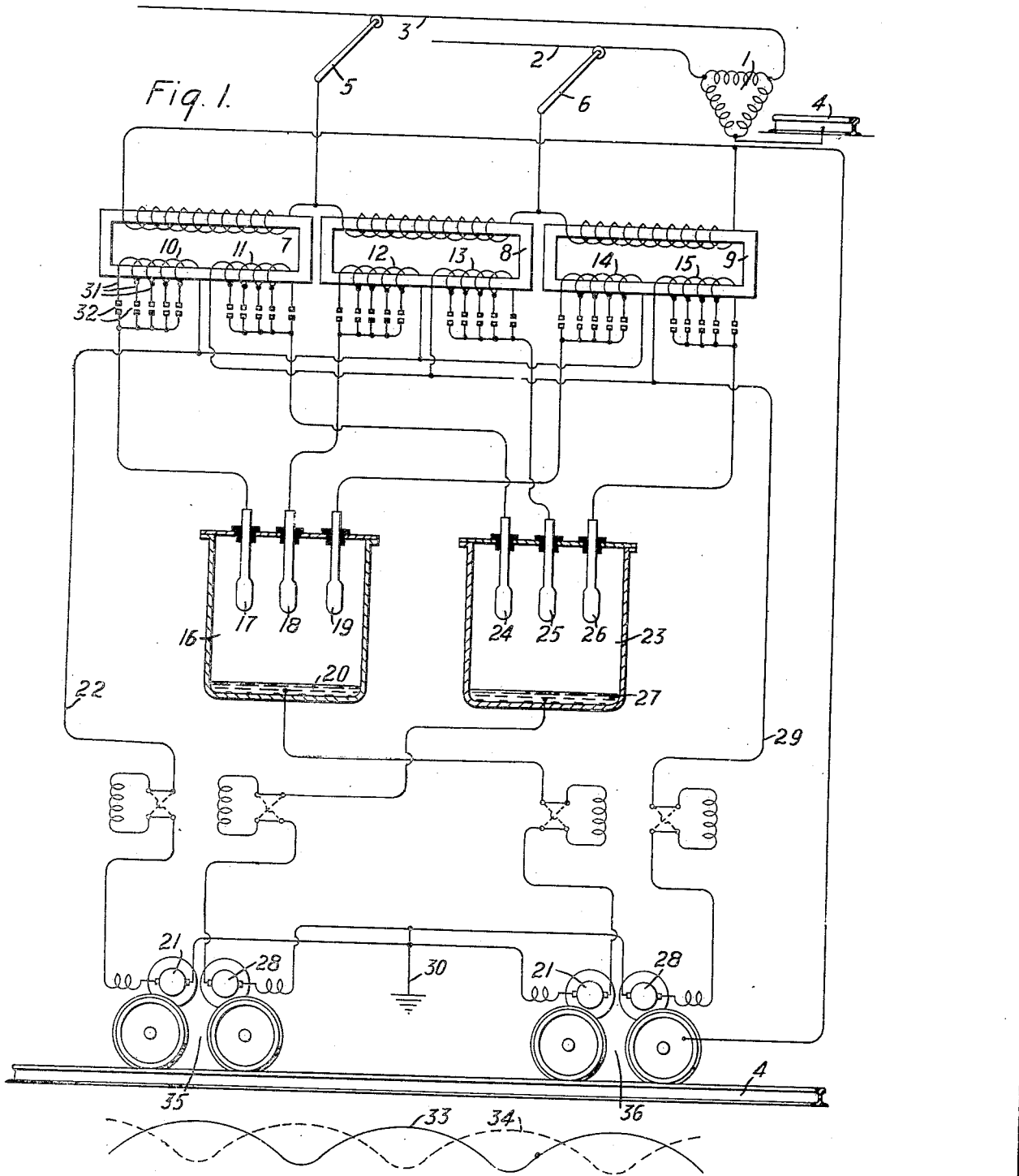

KARL A. SIMMON, OF WILKINSBURG, PENNSYLVANIA, ASSIGNOR TO WESTINGHOUSE ELECTRIC AND MANUFACTURING COMPANY, A CORPORATION OF PENNSYLVANIA.

SUPPLY SYSTEM FOR RAILWAY-VEHICLES.

1,286,130.   Specification of Letters Patent.   Patented Nov. 26, 1918.

Application filed September 5, 1916. Serial No. 118,446.

*To all whom it may concern:*

Be it known that I, KARL A. SIMMON, a citizen of the United States, and a resident of Wilkinsburg, in the county of Allegheny and State of Pennsylvania, have invented a new and useful Improvement in Supply Systems for Railway-Vehicles, of which the following is a specification, this application being a continuation in part of my application, Serial No. 843,947, filed June 9, 1914.

My invention relates to a system of current supply for the vehicles of electric railways, and it has for its object to provide a system of the character specified wherein power may be transmitted and controlled in an efficient manner and supplied to motors having excellent operating characteristics.

In the accompanying drawing, Figure 1 is a diagrammatic view of a system of distribution embodying my invention, and Fig. 2 is a wave diagram showing the phase relations of the current of the two rectifiers shown in Fig. 1.

A source of three-phase alternating currents 1 is connected to two trolley wires 2 and 3 and to the rail 4 of an electric railway. Two trolleys 5 and 6 and the wheels of the vehicle supply the three-phase currents to three transformers 7, 8 and 9 mounted on the vehicle. The primary windings of these transformers may be connected either in Y or in delta, as is preferred. The transformers 7, 8 and 9 are each provided with two secondary windings 10, 11, 12, 13, 14 and 15. One terminal of the winding 10 is connected to an anode 17 of a rectifying device 16 of any suitable character, such, for example, as a mercury arc rectifier. In a similar manner, one terminal of the winding 12 is connected to an anode 18 and one terminal of the winding 14 is connected to an anode 19. The cathode 20 of the rectifier 16 is connected, through half the pulsating current motors 21 of the vehicle, to a return wire 22 which connects together the free terminals of the windings 10, 12 and 14.

In like manner, one terminal of each of the windings 11, 13 and 15 is connected to the anodes 24, 25 and 26 of a rectifier 23. The cathode 27 of the rectifier 23 is connected, through the other half 28 of the pulsating current motors of the vehicle and through a return wire 29, to the free terminals of the secondary windings 11, 13 and 15. Where each rectifier supplies an even number of motors, as is shown in the drawing, the conductor between the motors may be connected to the ground, as shown at 30, in order to reduce, so far as possible, the voltage strains on the insulation of the motors.

In order to vary the rectifier voltage and the speed of the motors, the secondary windings 10, 11, etc., are provided with a plurality of taps 31—31, and connection is made between these taps and the wire leading to the anode by means of contact-making devices 32, as is well known in the art. Since this is an ordinary method of varying the voltage on the load supplied by the secondary of a transformer, I do not deem it essential to go into a detailed description of the specific contact-making devices employed or of the means used for actuating such contact-making devices in any desired order.

The connections of the windings 11, 13 and 15 are reversed with respect to the connections of the windings 10, 12 and 14, so that the two secondary windings on any one transformer are alternately active, since waves of but one polarity are allowed to flow through the rectifiers 16 and 23. Because of this phase displacement of 180° between the two secondary currents of a transformer, the ripples of the rectified currents from rectifiers 16 and 23, respectively, will be displaced as shown in Fig. 2, wherein the full line 33 represents the wave form of the rectified current from the device 16, and the dotted line 34 represents the wave form of the rectified current of the device 23.

The pulsating current supplied to the respective motors produces pulsating torque therein and if the two motors 21 deriving current from the rectifier 16 are mounted on the same truck while the two motors 28—28 operating from the rectifier 23 are mounted on another truck, said trucks alternately tend to approach and recede from each other, resulting in disagreeable vibration of the railway vehicle. I, therefore, mount one of the motors 21 on the forward truck 35 and the other on the rear truck 36. In like manner, the two motors 28—28 are mounted on the different trucks. Thus the pulsating torques developed in the two motors mounted on any given truck have their maximum and minimum periods displaced with respect to each other, respectively, but the total or net propulsive effort developed in any given truck remains substantially uniform. There is thus no force tending to cause the trucks to alter their distance from each other and a much smoother riding vehicle is insured.

With my system of distribution, I am enabled to operate three-phase induction motors directly from the transformers, if found desirable, as well as the pulsating current motors shown, with the well known advantages of ease of starting, excellent speed control, absence of commutation difficulties, and the ability to feed back power to the line on down grades.

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or as are indicated in the appended claims.

I claim as my invention:

1. The combination with an electrically propelled vehicle provided with a plurality of trucks and with a plurality of pulsating-torque propulsion motors on each truck, of means for energizing each of a set of motors comprising at least one motor on each of two trucks with like amounts of energy having impulses of like time phase, and means for similarly energizing an additional similar set of motors, the energy impulses of said two energizing means being so offset in phase-relation that the torque impulses on any given truck are non-simultaneous.

2. The combination with an electrically propelled vehicle provided with two trucks and with two pulsating-torque motors on each truck, of means for energizing one motor on each truck with like amounts of energy having impulses of like time-phase, and means for similarly energizing the remaining motors, the energy impulses of said two energizing means being so offset in phase-relation that the torque impulses on any given truck are non-simultaneous.

3. The combination with an electrically propelled vehicle provided with two trucks and with two pulsating-torque motors on each truck, of means for energizing one motor on each truck with amounts of energy having a predetermined relative ratio and having impulses of like time-phase, and means for similarly energizing the remaining motors, the energy impulses of said two energizing means being so offset in phase-relation that the torque impulses on any given truck are non-simultaneous.

4. In an electrically propelled vehicle deriving energy from a source of alternating currents, rectifying means for producing two flows of pulsating current having energy impulses of relatively displaced phase, two trucks, two propulsion motors on each truck, means for passing one of said pulsating currents through a motor on each truck, respectively, and means for passing the remaining pulsating current through the remaining motors, whereby the amounts of energy developed in each truck bear a predetermined ratio to each other and the energy in either truck is developed in a series of non-simultaneous impulses derived alternately from each of the two motors thereon.

In testimony whereof, I have hereunto subscribed my name this 29th day of August 1916.

KARL A. SIMMON.